May 10, 1932.  J. B. FRIEDMAN  1,857,685
DISPENSING DEVICE
Filed March 26, 1930
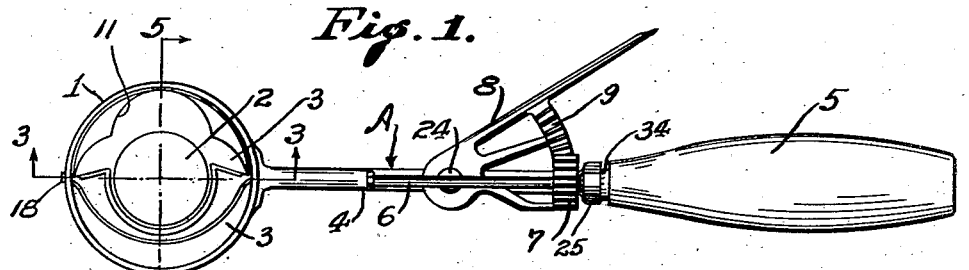
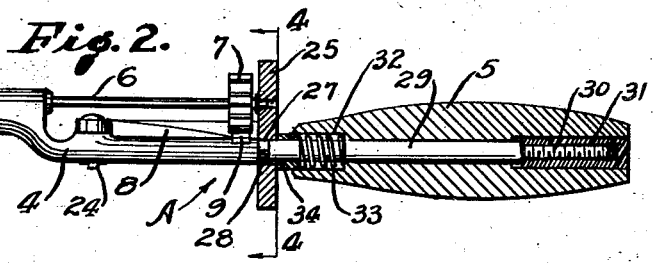
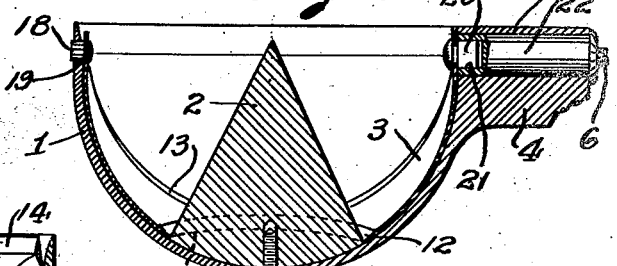
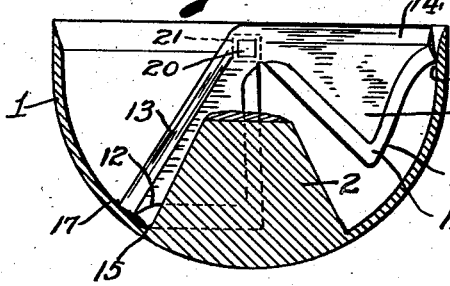
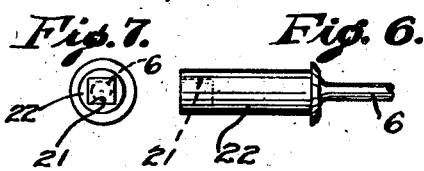
Inventor
Joseph B. Friedman.
By Ambrose J. Larrabee
His Attorney.

Patented May 10, 1932

1,857,685

UNITED STATES PATENT OFFICE

JOSEPH B. FRIEDMAN, OF LOS ANGELES, CALIFORNIA

DISPENSING DEVICE

Application filed March 26, 1930. Serial No. 439,048.

This invention relates to devices for dispensing food, and particularly to ice cream dishers.

An object is to provide a novel device for dishing or dispensing food, such as frozen confections, as ice cream, custards, ices or the like; or mashed potatoes etc.; whereby a recess is automatically formed in the top of each portion or scoop dispensed by the device, so that an edible substance, such as a confection of a different flavor or color, jelly, syrup, nuts, gravy or the like may be placed in said recess, thus producing a novel confection or edible substance.

Another object is to provide a novel dispensing device which is sanitary, and which may be readily disassembled and assembled for cleaning purposes.

The invention consists in the novel features of construction, the combination of elements and parts hereinafter more particularly described and pointed out in the claims.

Other objects, advantages and features of invention may appear from the accompanying drawings, the subjoined detail description and the appended claims.

My invention is illustrated in the annexed drawings which forms a part of this specification and in which, Figure 1 is a plan view of a dispensing device constructed in accordance with my invention.

Fig. 2 is a side elevation of the same, parts being shown in longitudinal section for purposes of clearness.

Fig. 3 is an enlarged fragmental longitudinal section of the dispensing bowl and associated parts, taken on line 3—3, Fig. 1.

Fig. 4 is a transverse cross section of the device taken on line 4—4, Fig. 2.

Fig. 5 is an enlarged cross section of the bowl taken on a plane indicated by line 5—5, Fig. 1, but showing a protuberance and bowl of one piece.

Fig. 6 is a fragmental detail view of the inner end of the scraper rock shaft.

Fig. 7 is an end view of Fig. 6.

Fig. 8 is a side elevational view of an article of food, such as a cake of frozen confection dished by my invention.

Corresponding parts are designated by the same reference characters in all of the figures in the drawings.

My invention comprises a semi-spherical bowl 1, a core, projection or protuberance 2 which may be of any suitable or desired formation upstanding from the bottom of bowl 1, a scraper 3, a handle member A, including a frame 4, a hand-piece 5 mounted on said frame, a scraper shaft 6, a pinion 7 on the outer end of said shaft, a thumb lever 8 and an arcuate rack 9 formed on said lever and in mesh with said pinion.

A suitable spring (not shown) engages the lever 8 and normally holds the lever in its outward and initial position in which position of the lever (Fig. 1) the scraper rests in the position shown in Fig. 5.

The core or protuberance 2 may be secured in the bottom of the bowl 1 in any suitable manner, as for example, it may be cast integral therewith as one unitary member as shown in Fig. 5, or it may be soldered or brazed to the wall of the bowl, or it may be secured to the bottom of the bowl by a screw 10 extended through the wall of the bowl, as shown in Fig. 3. By securing the core in the bowl by means of the screw 10, the core may be removed at any time and a core of different size or shape may be secured in the bowl as desired.

The scraper 3 is in the form of a blade of a curvature corresponding to and fitting the curved inner surface of the bowl 1 and is provided with an opening or cut out portion 11 therein through which the core 2 projects, the inner edge of the scraper around its opening 11 being beveled to a blade edge 12 which rests adjacent the inner surface of the bowl 1 and the outer edge of the scraper being formed with blade edges 13 and 14 which lie adjacent the inner surface of the bowl 1. In its normal position, as particularly illustrated in Fig. 5, the blade edge at one side of end of the opening 11 lies adjacent one side of the core 2 as indicated at 15, while the edge 12 at the other end of said opening lies near the top of the bowl at one side thereof as indicated at 16, while the outer edge 13 of the scraper extends downwardly within the bowl and to a point immediately forward of the lower end of the protuberance as indicated at 17 while the outer edge 14 of the scraper lies adjacent the upper edge of the bowl. One side of the scraper is detachably pivoted to the bowl near the upper and forward edge thereof by means of a pivot 18 secured to the scraper and turnably fitted in opening or bearing 19 in the wall of the bowl. The other side of the scraper is also pivoted in the other side of the bowl 1 by means of a square stud 20 fixed to and extending from the scraper and fitted in a square opening 21 formed in one end of a journal 22 that is provided on one end of scraper shaft 6. The journal 22 is turnably fitted in a bearing 23 formed on the frame 4 adjoining the bowl 1 whereby the scraper is non-rotatably mounted relative to the shaft 6 and is turned in one direction or the other as the scraper shaft 6 is correspondingly turned. The thumb lever 8 is pivoted to the frame 4 by means of pivot 24. The outer end of the scraper shaft 6 is journaled in the upper end of an arm, washer or bracket 25.

The bracket 25 is provided with a recess 26 whereby it is slidably and rotatably mounted on the handle member A and recess 26 is provided with a flattened side 27 which engages a flattened portion 28 on frame 4. A shank 29 extending from portion 28 is of a slightly smaller diameter than portion 28 and is threaded at its end as at 30 for engagement with a bushing 31 which is non-rotatably fitted in one end of hand piece 5 that is provided at its other end with an enlarged bore 32. A spring 33 encircling shank 29 operates between the end of bore 32 and a sleeve or collar 34 that abuts against the bracket member 25 to hold said member in engagement with the flattened portion 28 to hold the bracket 25 from rotational movement and to maintain the outer end of shaft 6 in journal engagement in the bracket 25.

The operation of my invention is as follows: The hand piece 5 is grasped by the operator in one hand and the bowl is inserted into the food to be dispensed, such as a container of ice cream or other frozen confection, and a cake or scoop of the food or confection is transferred into the bowl until the bowl is full, whereupon, the bowl is removed and the lever 8 upon being pressed inwardly by the thumb of the operator's hand holding the hand piece 5, the scraper 3 is swung clockwise (Fig. 5) through the medium of the rack 9, pinion 7, shaft 6, journal 22 and stud 20, during which movement of the scraper, the scraper blade 13 cuts the contents of bowl 1 from the wall upwardly from the outer side of the core to the upper edge, of the bowl while the inner edge 12 of the scraper cuts the bowl contents from the wall of the bowl downwardly from the inner upper edge of the bowl to the inner side of the core 2, and upon releasing the lever, the scraper is automatically swung backwardly in a counter clockwise direction to initial starting position by means of the spring operating in connection with lever 8, rack 9, pinion 7, shaft 6, journal 22 and stud 20, during which movement of the scraper the bowl contents will be completely separated from bowl 1 in the event such contents are not separated by the first travel of the scraper.

When the bowl contents 34', Fig. 8, is cut or separated from the bowl by the scraper 3, the bowl being inverted, the scoop of food 34' drops out of the bowl in the form illustrated in Fig. 8 with a recess 35 automatically formed in the top therein. In the recess 35 may be placed an edible substance such as a confection of a different flavor or color, jelly, syrup, nuts, gravy or the like, thus providing a novel edible substance.

The scraper being of relatively thin resilient material, may be readily removed from the bowl if desired by merely pressing the outer pivot 18 of the scraper inwardly until the pivot 18 disengages from its bearing 19 and then the scraper may be easily withdrawn from the bowl by moving the scraper inwardly until the square stud 20 disengages from the square socket 21 in the inner end of the journal 22.

To disengage the shaft 6 from the frame 4, I have provided means whereby the same may be easily and expeditiously accomplished with a minimum amount of effort. The bracket member which projects on opposite sides of frame 4 is grasped by the fingers of the operator in straddle relation to the frame and the bracket member is then pulled toward the hand member 5 against the tension of the spring 33 until the member 25 is released from engagement with the flattened portion 28 at which position the shaft 6 will be free from its journal in member 25 and the bracket 25 will be rotated upon shank 29 so that the shaft 6, journal 22 and its associated pinion 7 may be withdrawn from the frame 4 if desired.

I claim:

1. A dispensing device comprising a bowl, a handle extending from said bowl; means for removing from said bowl material received in said bowl; a shaft connected to operate said means; and a bearing member slidably mounted on said handle for supporting one end of said shaft.

2. A dispensing device comprising a bowl, a handle extending from said bowl; means for removing from said bowl material received in said bowl; a shaft connected to operate said means; and a bearing member slidably and rotatably mounted on said handle for supporting one end of said shaft and to permit removal of said shaft.

3. In a dispensing device, a bowl; a handle member extending from said bowl; scraping means in said bowl; means connected to oscillate said scraping means, including a shaft; a bearing member slidable and rotatable on said handle member and in which said shaft is journaled; spring means normally urging said bearing member into journal engagement with said shaft; and means whereby said bearing member may be manually disengaged from said shaft against tension of said spring means to permit withdrawal of said shaft.

4. In a dispensing device, a bowl; a handle member extending from said bowl; scraping means in said bowl; means connected to oscillate said scraping means, including a shaft; a bearing member slidable and rotatable on said handle member and in which said shaft is journaled; means normally urging said bearing member into journal engagement with said shaft; and means whereby said bearing member may be manually disengaged from said shaft to permit withdrawal of said shaft.

5. A dispensing device comprising a bowl, a protuberance in the bottom portion of said bowl adapted to form a recess in material discharged therefrom, a handle for the bowl, a scraper comprising a blade portion adapted to scrape the interior surface of the bowl, said blade portion having an opening adapted to receive with a clearance therearound said protuberance adjacent to its juncture with the inner surface of the bowl, said clearance being sufficiently great to permit effective operation of said scraper, and means to operate said scraper.

6. A dispensing device comprising a bowl; a fixed protuberance in said bowl adapted to form a recess in material discharged therefrom; a handle for the bowl; a scraper pivoted to the bowl on opposite sides of said protuberance, and having an opening adapted to receive said protuberance with a clearance; and means to operate said scraper to dispense the contents in the bowl.

7. A dispensing device comprising a bowl, a fixed protuberance in said bowl for forming a recess in the material in the bowl; a scraper comprising two blades for scraping said material from the bowl at opposite sides respectively of said protuberance, said scraper being pivoted to said bowl on opposite sides of said protuberance; and means for operating said scraper, said scraper being so constructed and arranged that when said scraper is operated one of said blades moves toward said protuberance and the other of said blades moves away from said protuberance.

8. A dispensing device comprising a bowl; a handle extending from said bowl; means movable across the interior of the bowl to remove from said bowl material received in said bowl; a shaft connected to operate said means, a bearing member slidably mounted on said handle for supporting one end of said shaft and to permit disengagement of said bearing member from said shaft; and means to rotate said shaft.

In testimony whereof, I have hereunto set my hand at Los Angeles, California, this 22 day of March, 1930.

JOSEPH B. FRIEDMAN.